United States Patent
Jung et al.

(10) Patent No.: US 10,499,441 B2
(45) Date of Patent: Dec. 3, 2019

(54) METHOD FOR OPERATING TERMINAL IN WIRELESS COMMUNICATION SYSTEM AND TERMINAL USING SAME

(71) Applicant: LG ELECTRONICS INC., Seoul (KR)

(72) Inventors: Sunghoon Jung, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 99 days.

(21) Appl. No.: 15/322,988

(22) PCT Filed: Jul. 2, 2015

(86) PCT No.: PCT/KR2015/006837
§ 371 (c)(1),
(2) Date: Dec. 29, 2016

(87) PCT Pub. No.: WO2016/003222
PCT Pub. Date: Jan. 7, 2016

(65) Prior Publication Data
US 2017/0142759 A1    May 18, 2017

Related U.S. Application Data

(60) Provisional application No. 62/020,372, filed on Jul. 2, 2014.

(51) Int. Cl.
| | | |
|---|---|---|
| H04W 4/00 | (2018.01) | |
| H04W 76/10 | (2018.01) | |
| H04W 12/08 | (2009.01) | |
| H04W 12/10 | (2009.01) | |
| H04W 48/20 | (2009.01) | |
| H04W 76/16 | (2018.01) | |
| H04W 88/06 | (2009.01) | |
| H04W 12/00 | (2009.01) | |

(52) U.S. Cl.
CPC ........... *H04W 76/10* (2018.02); *H04W 12/08* (2013.01); *H04W 12/10* (2013.01); *H04W 48/20* (2013.01); *H04W 76/16* (2018.02); *H04W 12/00516* (2019.01); *H04W 88/06* (2013.01)

(58) Field of Classification Search
CPC ..... H04W 76/10; H04W 76/02; H04W 48/20; H04W 12/08; H04W 12/10
USPC ....................................................... 370/329
See application file for complete search history.

(56) References Cited

U.S. PATENT DOCUMENTS

2006/0276190 A1* 12/2006 Shaheen ........... H04W 36/0061
455/436
2013/0242965 A1* 9/2013 Horn ..................... H04W 24/10
370/338

(Continued)

FOREIGN PATENT DOCUMENTS

WO    2010-095896 A2    8/2010
WO    2013-186024 A1    12/2013
(Continued)

*Primary Examiner* — Mang Hang Yeung
(74) *Attorney, Agent, or Firm* — Dentons US LLP

(57) ABSTRACT

Provided are a method for operating a terminal in a wireless communication system and a terminal using the method. The method is characterized by: the terminal, which is connected to a first network, performing a step for interworking with second network; and reporting, to the first network, the result of performing the step for interworking.

2 Claims, 18 Drawing Sheets

(56) References Cited

U.S. PATENT DOCUMENTS

| | | | | |
|---|---|---|---|---|
| 2013/0308445 | A1* | 11/2013 | Xiang | H04W 28/0231 370/230 |
| 2014/0079022 | A1* | 3/2014 | Wang | H04W 36/22 370/331 |
| 2014/0092886 | A1* | 4/2014 | Gupta | H04W 4/70 370/338 |
| 2014/0204927 | A1* | 7/2014 | Horn | H04W 76/16 370/338 |
| 2014/0341182 | A1* | 11/2014 | Gage | H04W 12/04 370/331 |

FOREIGN PATENT DOCUMENTS

| | | |
|---|---|---|
| WO | 2014-069959 A1 | 5/2014 |
| WO | 2014-098506 A1 | 6/2014 |

* cited by examiner

FIG. 13
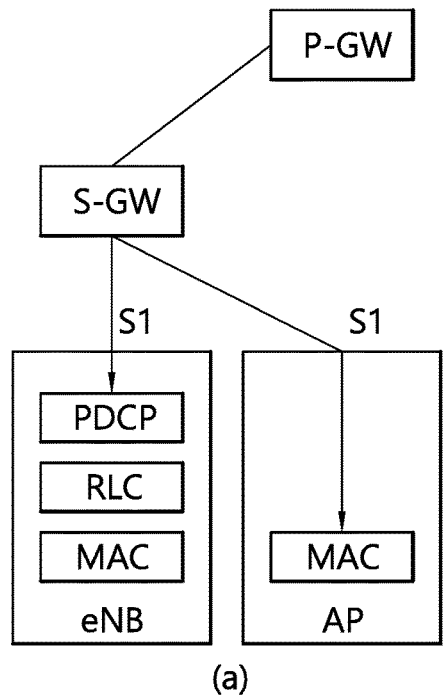
(a)
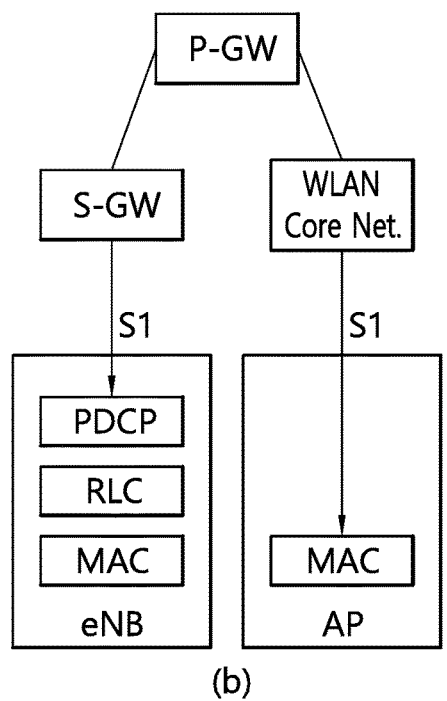
(b)

FIG. 15
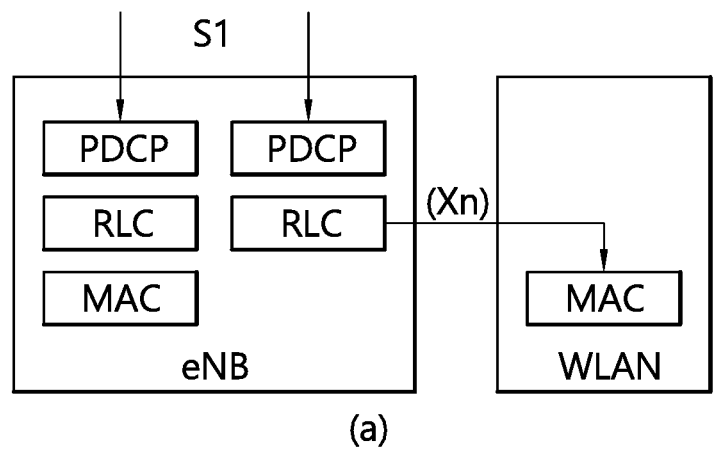
(a)
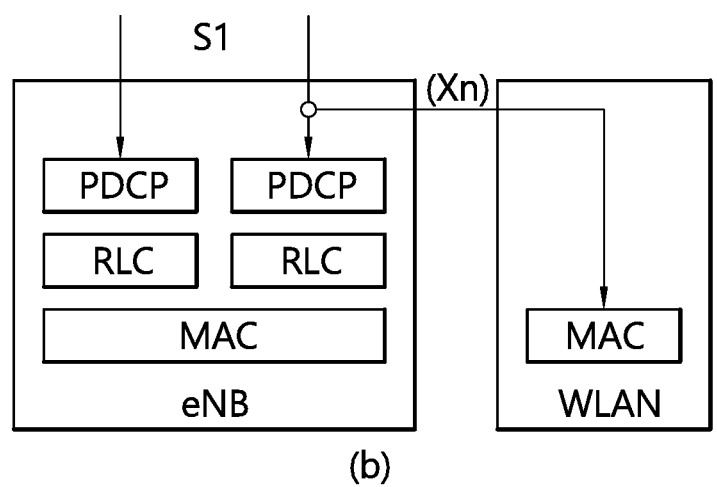
(b)

FIG. 16
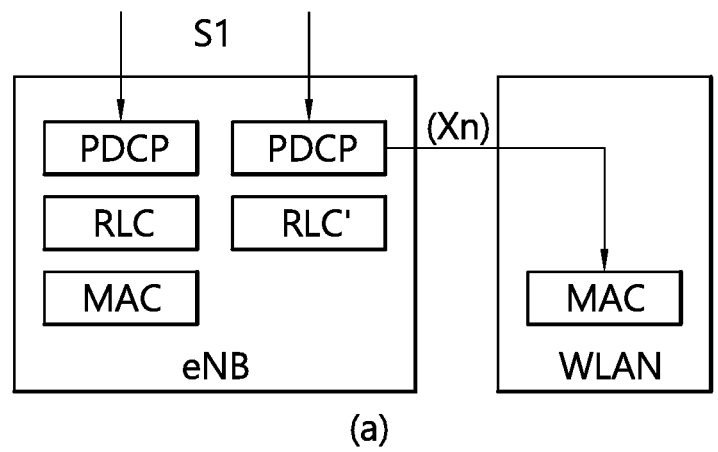
(a)
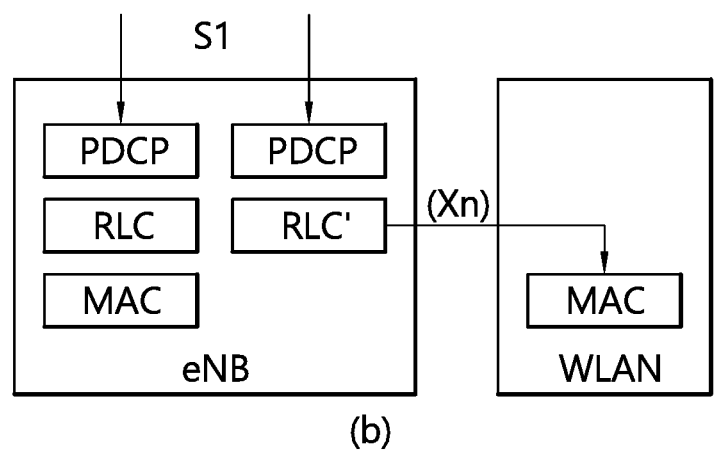
(b)

METHOD FOR OPERATING TERMINAL IN WIRELESS COMMUNICATION SYSTEM AND TERMINAL USING SAME

CROSS-REFERENCE TO RELATED APPLICATIONS

This application is the National Stage filing under 35 U.S.C. 371 of International Application No. PCT/KR2015/006837, filed on Jul. 2, 2015, which claims the benefit of U.S. Provisional Application No. 62/020,372 filed on Jul. 2, 2014, the contents of which are all hereby incorporated by reference herein in their entirety.

BACKGROUND OF THE INVENTION

Field of the Invention

The present invention relates to wireless communication, and more particularly, to a method for operating a user equipment (UE) for supporting interworking between heterogeneous networks in a wireless communication system and the user equipment using the same.

Related Art

3GPP (3rd Generation Partnership Project) LTE (long term evolution), a development of UMTS (Universal Mobile Telecommunication System), was introduced in 3GPP Release 8. 3GPP LTE uses OFDMA (orthogonal frequency division multiple access) for the downlink and SC-FDMA (Single Carrier-frequency division multiple access for the uplink. Recently, there have been discussions about 3GPP LTE-A (LTE-Advanced), which is an evolution of 3GPP LTE.

A wireless communication system may have support for services to UEs over multiple access networks. For example, a UE may receive service from a 3GPP access network, which is a wireless communication system, and also may receive service from a non-3GPP access network, such as WIMAX (Worldwide Interoperability for Microwave Access) or WLAN (Wireless Local Area Network).

A UE may establish a connection with a 3GPP access network to receive a service, and if traffic overload occurs to the 3GPP access network, may handle the traffic over another access network, i.e., a non-3GPP access network, to improve the overall network efficiency. Reversely, a UE connected to a non-3GPP access network may handle traffic using a 3GPP access network for efficiency.

Suppose that there are two different networks: a first network and a second network. Interworking refers to the ability of a UE connected to the first network to access and use resources or services offered by the second network. In the conventional art, the UE is given predetermined rules for interworking and performs interworking according to these rules. That is, a network informs the UE of interworking rules, and the UE performs interworking by itself.

Meanwhile, a transmitting end may split one data stream into multiple partial streams and transmit them over different networks, and a receiving end may receive and aggregate the multiple partial streams into a data stream. For example, the transmitting end may split a data stream into first and second partial streams, and transmit the first partial stream over a 3GPP access network (e.g., LTE) and the second partial stream over a non-3GPP access network (e.g., WLAN). Then, the receiving end may receive the first and second partial streams over the LTE and the WLAN and aggregate them to restore/create the single data stream.

In this transmission scheme, it is very important to control transmission delays to below a certain value when transmitting each partial stream. If the transmission delay of a particular partial stream is greater than the certain value, it is hard to aggregate the partial streams in sequence into the original data stream, and re-transmissions of the partial streams may occur, thus leading to an abrupt decrease in transmission efficiency.

By the way, in the conventional art, it is not a network but a UE that determines whether to perform interworking or not, which makes it difficult for the network to control transmission efficiency. For example, in some situations, a UE connected to a first network may interwork with a second AP, among APs (access points) in a second network, while there are difficulties in interworking with a first AP. According to the conventional art, it is hard for the first network to control the UE since it cannot be aware of the situation.

SUMMARY OF THE INVENTION

A technical problem to be solved by the present invention is to provide a method for operating a UE for interworking in a wireless communication system and a UE using the same.

In an aspect, a method for operating of a user equipment (UE) in a wireless communication system is provided. The method comprising performing, by the UE which is connected with a first network, a procedure for interworking with a second network and reporting a result of the procedure for the interworking to the first network.

The procedure for the interworking may be an authentication procedure, an association procedure, or an authorization procedure for the second network.

The first network may send a request which indicates performing the procedure for the interworking with the second network to the UE.

The request may include information indicating at least one access point (AP) of the second network.

The result of the procedures for interworking may comprises information indicating whether the UE has successfully performed the procedures for the interworking and information indicating an access point (AP) with the second network for which the UE has performed the procedures for the interworking.

The first network may transmit a command for instructing the UE to interwork with the AP.

The first network may transmit the command based on the results of the procedures for interworking.

The first network may transmit a measurement configuration for access point (AP) of the second network to the UE.

The measurement configuration for the AP of the second network may include information indicating an AP which the UE is allowed to connect, and information indicating an event which is satisfied by the AP in order for the UE to connect to the AP.

If the AP included in the measurement configuration for AP of the second network satisfies the event, the UE may report the AP satisfying the event to the first network.

In another aspect, a user equipment (UE) which operates in a wireless communication system is provided. The UE comprising an radio frequency (RF) unit that sends and receives radio signals and a processor functionally coupled to the RF unit to operate, wherein the processor that performs, by the UE which is connected with a first network, a procedure for interworking with a second network, and reports a result of the procedure for the interworking to the first network.

According to an embodiment of the present invention, a UE connected to a first network performs procedures for interworking with APs in a second network and reports the result to the first network. The first network may be aware of which APs in the second network the UE can interwork with. The first network may found out which APs in the second network a particular UE can interwork with, and then perform interworking with these APs. This allows for efficient interworking control.

BRIEF DESCRIPTION OF THE DRAWINGS

FIG. 13 to FIG. 17 represent an example of interworking architecture of a first network (LTE) and a second network (WLAN).

DESCRIPTION OF EXEMPLARY EMBODIMENTS

Figure 1:
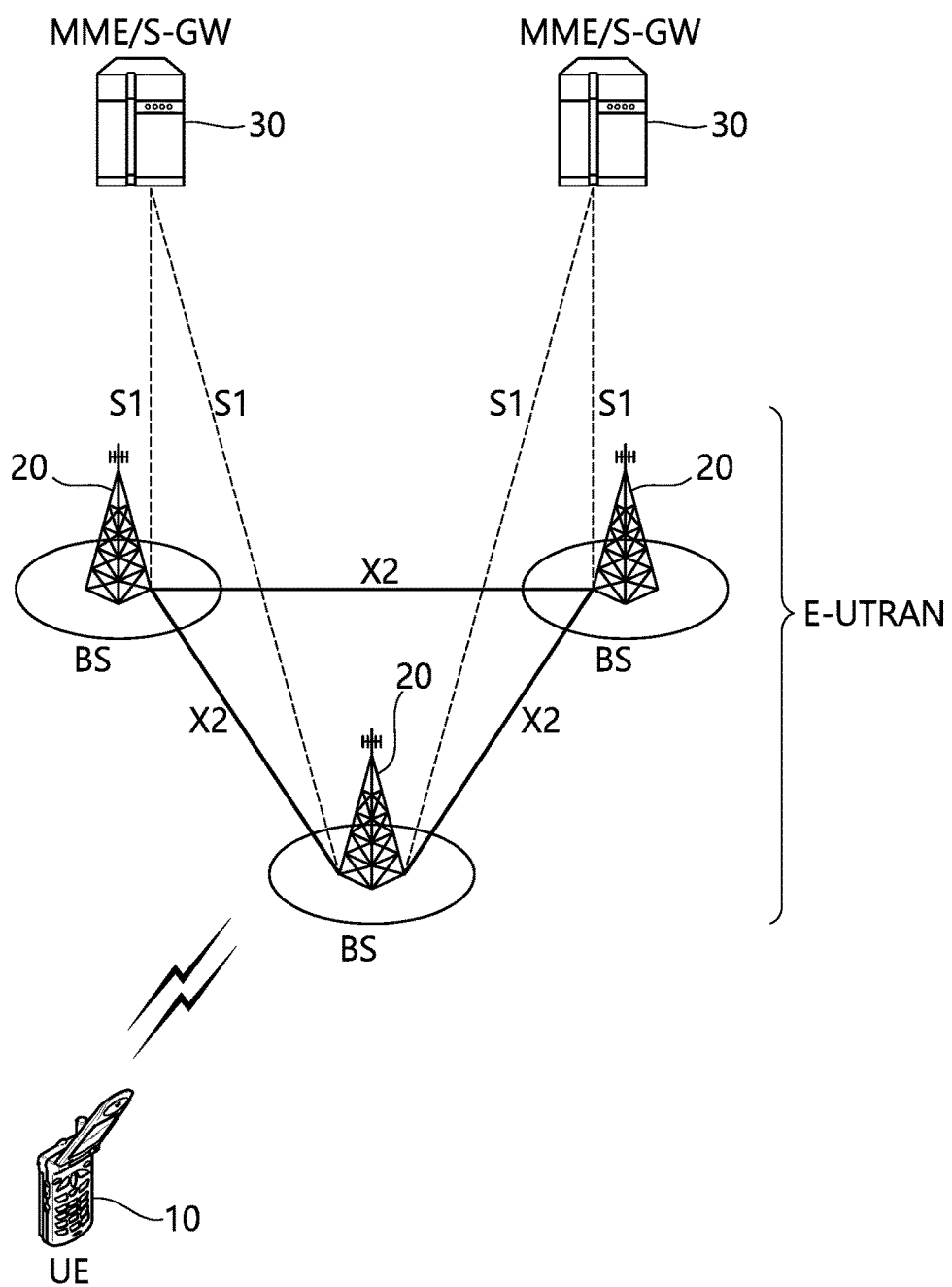
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
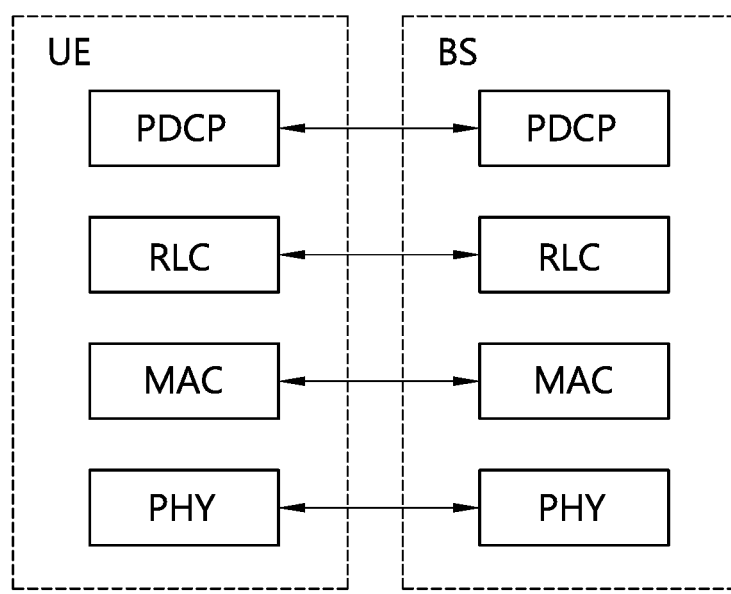
FIG. 2 is a diagram showing a wireless protocol architecture for a user plane.
Figure 3:
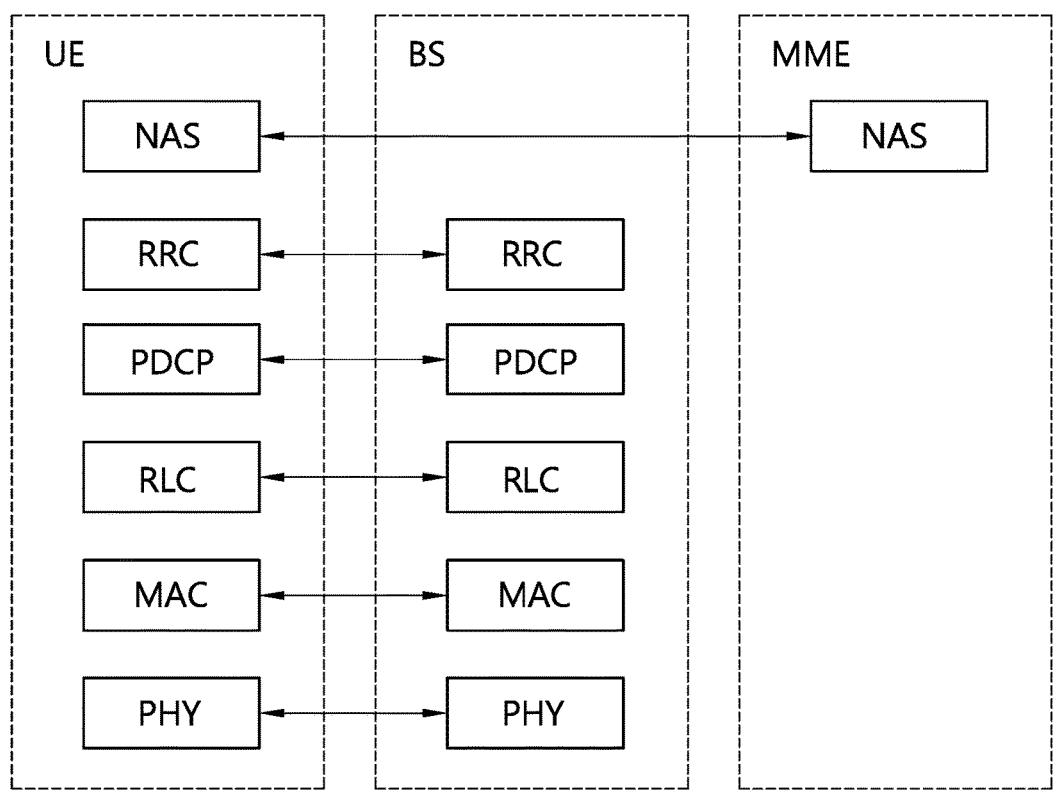
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

As set forth in 3GPP, physical channels, in 3GPP LTE, may be divided into data channels, such as a PDSCH (Physical Downlink Shared Channel) and a PUSCH (Physical Uplink Shared Channel), and control channels, such as a PDCCH (Physical Downlink Control Channel), a PCFICH (Physical Control Format Indicator Channel), a PHICH (Physical Hybrid-ARQ Indicator Channel), and a PUCCH (Physical Uplink Control Channel).

The PCFICH, which is transmitted in the first OFDM symbol of the sub-frame, carries a CIF (control format indicator) regarding the number of OFDM symbols (i.e., size of the control region) used for transmission of control channels in the sub-frame. The UE receives the CIF over the PCFICH and then monitors the PDCCH.

The PDCCH is a downlink control channel, and is also called a scheduling channel in a sense that it carries scheduling information. The control information transmitted through the PDCCH is referred to as downlink control information (DCI). The DCI may include resource allocation of the PDSCH (also referred to as DL (downlink) grant), resource allocation of the PUSCH (also referred to as UL (uplink) grant), set of transmit power control commands for individual UEs in any UE group and/or VoIP (Voice over Internet Protocol) activation.

In 3GPP LTE, blind decoding is used for detecting the PDCCH. Blind decoding is a scheme in which a desired identifier is demasked to the CRC of a received PDCCH (referred to as a candidate PDCCH) and CRC error check is conducted so as to identify whether the corresponding PDCCH is its own control channel.

After determining the PDCCH format according to the DCI to be sent to the UE, the base station adds a CRC (Cyclic Redundancy Check) to the DCI and masks the CRC with a unique identifier (which is referred to as RNTI (Radio Network Temporary Identifier)) depending on the owner or purpose of the PDCCH.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB 8. This may comply with the support of a radio access technology (RAT) that is taken into consideration.

If UE is an RRC connection state: The UE needs to be guaranteed so that it has the valid versions of the MIB, the SIB 1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
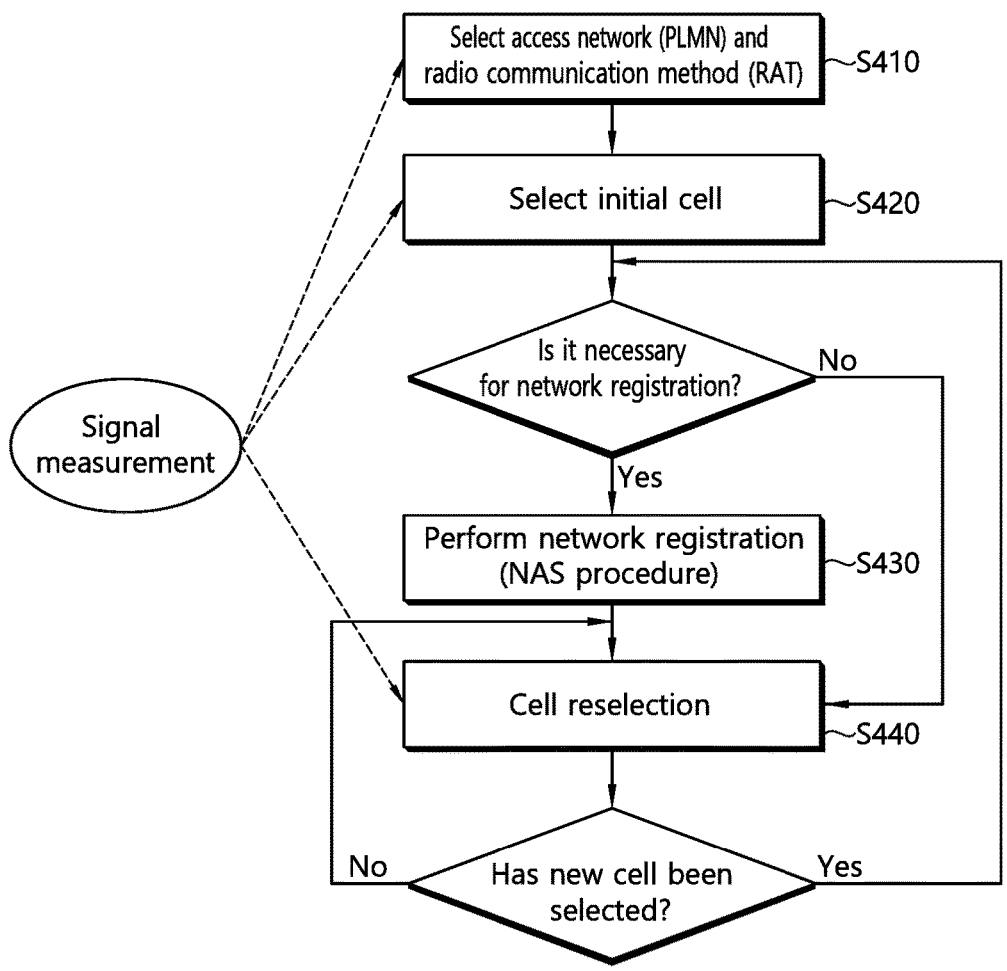
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
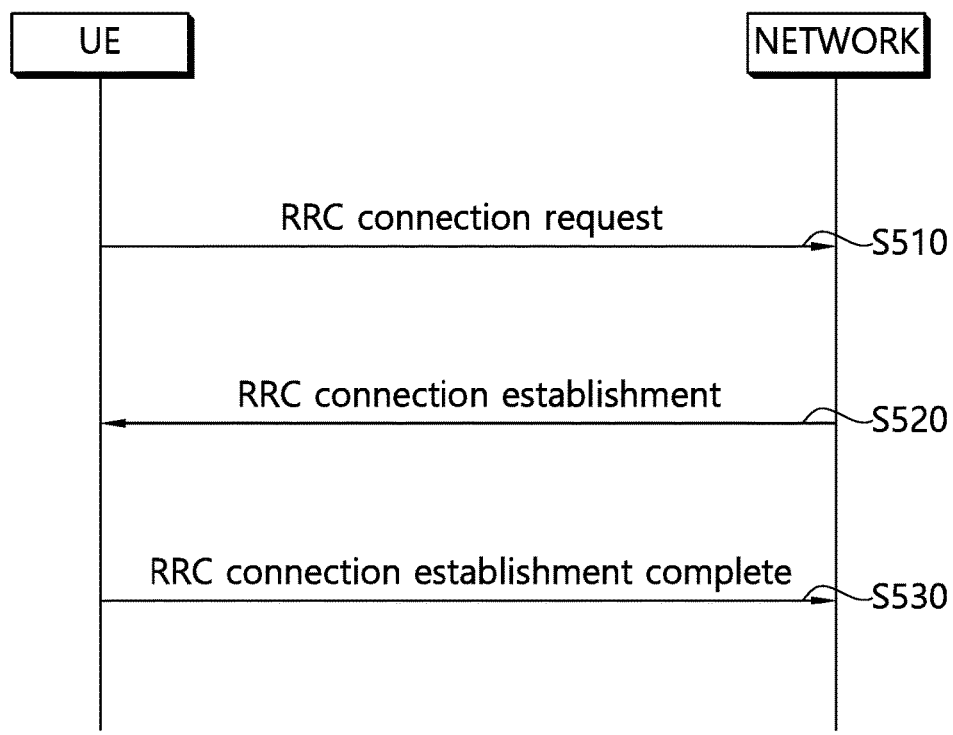
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
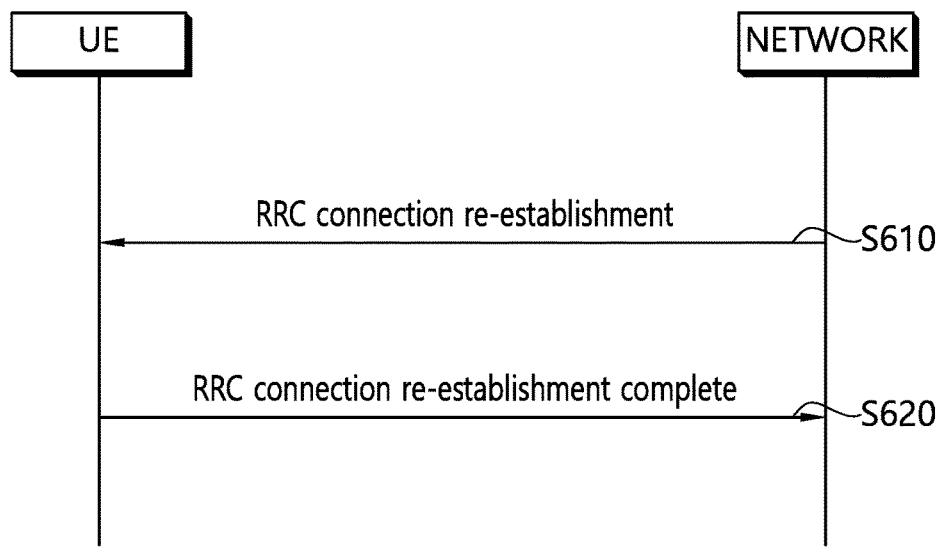
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RB s, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP.

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$\text{Srxlev} > 0 \text{ AND Squal} > 0, \quad [\text{Equation 1}]$$

where:

$$\text{Srxlev} = Q_{rxlevmeas} - (Q_{rxlevmin} + Q_{rxlevminoffset}) - P_{compensation},$$

$$\text{Squal} = Q_{qualmeas} - (Q_{qualmin} + Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

$Q_{rxlevminoffset}$ and $Q_{qualminoffset}$, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality. After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Figure 7:
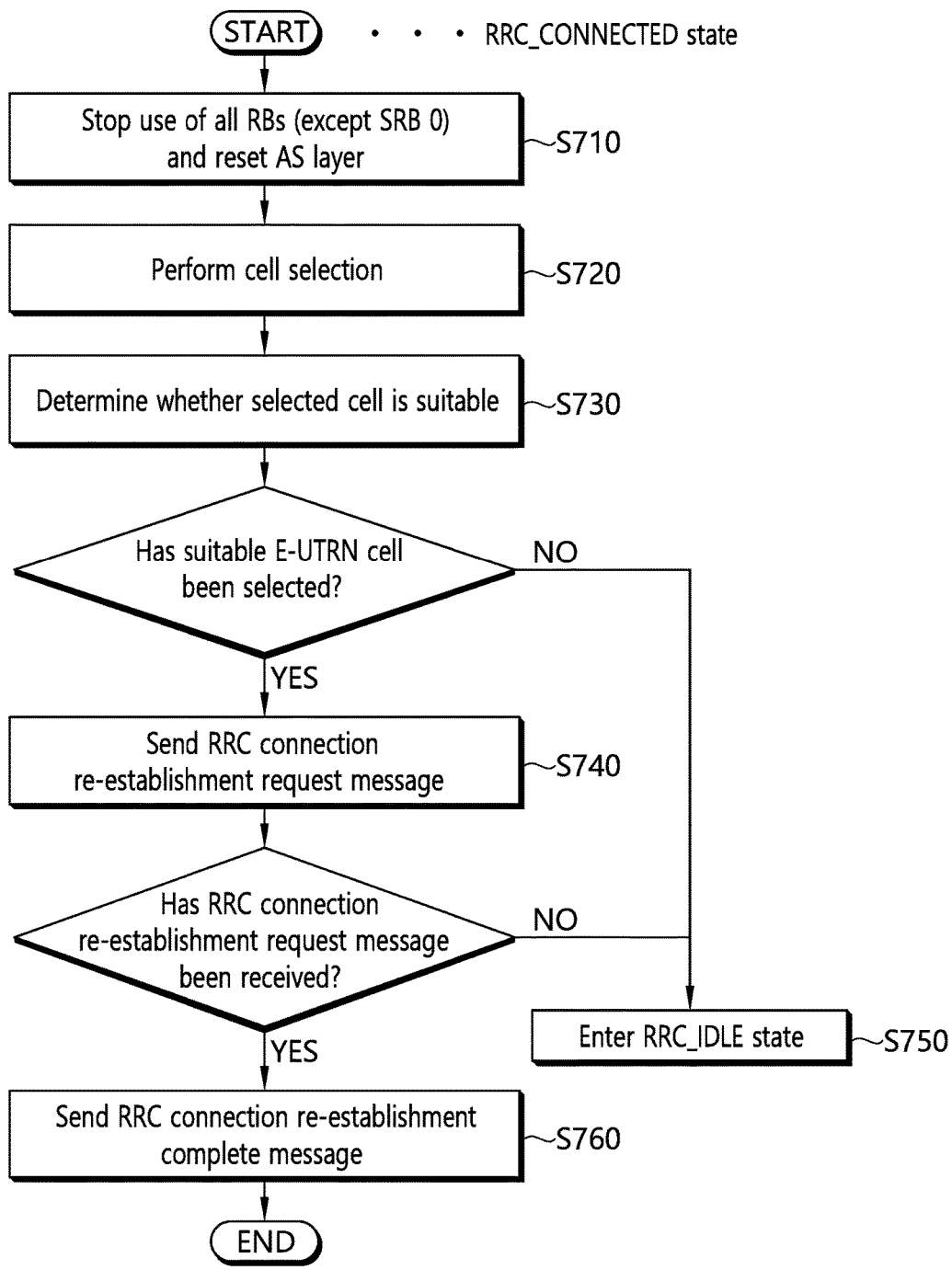
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Hereinafter, interworking between a 3GPP access network and another access network will be described.

In 3GPP, ANDSF (Access Network Discovery and Selection Functions) for discovering and selecting connectable access networks were standardized since interworking with non-3GPP access networks (e.g., WLAN) was first introduced in Release 8. An ANDSF provides discovery information (e.g., WLAN and WiMAX locations), which is a list of networks that may be available in the vicinity of the UE, inter-system mobility policies (ISMP), which reflect an operator's policies, and an inter-system routing policy. Based on this information, the UE may determine which traffic and which access network it will transmit over. The ISMP may include network selection rules for a UE with no more than one active access network connection (e.g., either WLAN or 3GPP). The ISRP may include network selection rules for a UE with potentially more than one active access network connection (e.g., both WLAN and 3GPP). The ISRP includes MAPCON (multiple-access PDN connectivity, IFOM (IP flow mobility), and non-seamless WLAN offloading. OMA DM (Open Mobile Alliance Device Management), etc. is used for dynamic provision between the ANDSF and the UE.

The MAPCON is a standardization of a technology which enables configuring and maintaining multiple packet data network (PDN) connectivity simultaneously through 3GPP access and non-3GPP access, and enables a seamless traffic offloading in units of all active PDN connections. To this end, an ANDSF server provides information, such as access point names (APN) for offloading, a routing rule on the priority order of access networks, a time of day for offloading, and a validity area of access networks for offloading. Offloading may be defined as the transfer of loads/traffic from a first access network to a second access network.

The IFOM supports more flexible and subdivided IP flow mobility and seamless offloading than the MAPCON. As opposed to the MAPCON, a technical feature of the IFOM enables the UE to access a packet data network through different access networks even when connected to the packet data network by using the same access point name (APN), and achieves service provision flexibility by enabling mobility and offloading units to move, not for each packet data network (PDN) but for each specific service IP traffic flow unit. To this end, the ANDSF server provides information, such as an IP flow to be offloaded, a routing rule on the priority order of access networks, a time of day for offloading, and a validity area of access networks for offloading.

The non-seamless WLAN offloading is a technology that does not change the path of specific IP traffic to the WLAN but completely offloads traffic so as not to pass through an EPC. Since this is not anchored to a P-GW for supporting the mobility, the offloaded IP traffic may not be seamlessly moved back to the 3GPP access network. To this end, the ANDSF server provides the UE with information similar to the information provided to perform the IFOM.

Figure 8:
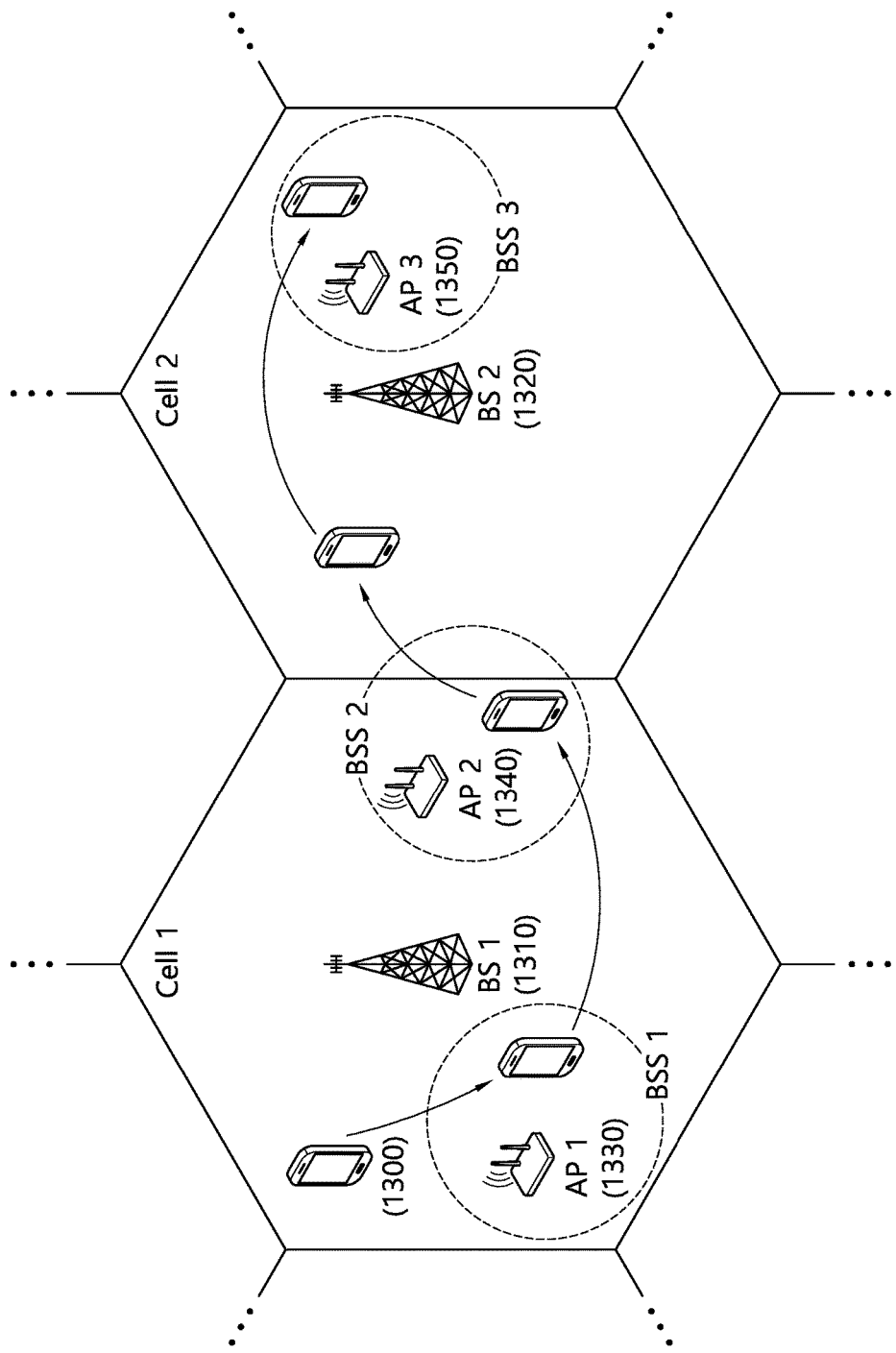
FIG. 8 is a diagram illustrating an example of an environment in which the 3GPP access network and the WLAN access network coexist.

FIG. 8 is a diagram illustrating an example of an environment in which the 3GPP access network and the WLAN access network coexist.

Referring to FIG. 8, as 3GPP access networks, Cell 1 is deployed around Base Station 1 1310, and Cell 2 is deployed around Base Station 2 1320. Also, BSS (Basic Service Set) 1 is deployed around Access Point (AP) 1 1330, BSS 2 is deployed around AP2 1340, and BSS 3 is deployed around AP3 1350 which exists within Cell 2. The coverage of the cells is indicated by solid lines, and the coverage of the BSSs is indicated by dotted lines.

It is assumed that the UE 1300 is configured to perform communication over at least either a 3GPP access network or a WLAN access network. IN this case, the UE 1300 may be called a station.

Initially, the UE 1300 may establish a connection with BS 1 1310 within Cell 1 and handle traffic over a 3GPP access network.

Suppose that the UE 1300 has entered the coverage of BSS 1 while moving within the coverage of Cell 1. In this case, if traffic handling between the UE 1300 and BS 1 1310 is not seamless, or traffic handling is more seamless with the AP 1 1330, the traffic may be transferred from the 3GPP access network to a WLAN access network to ensure efficiency.

Figure 9:
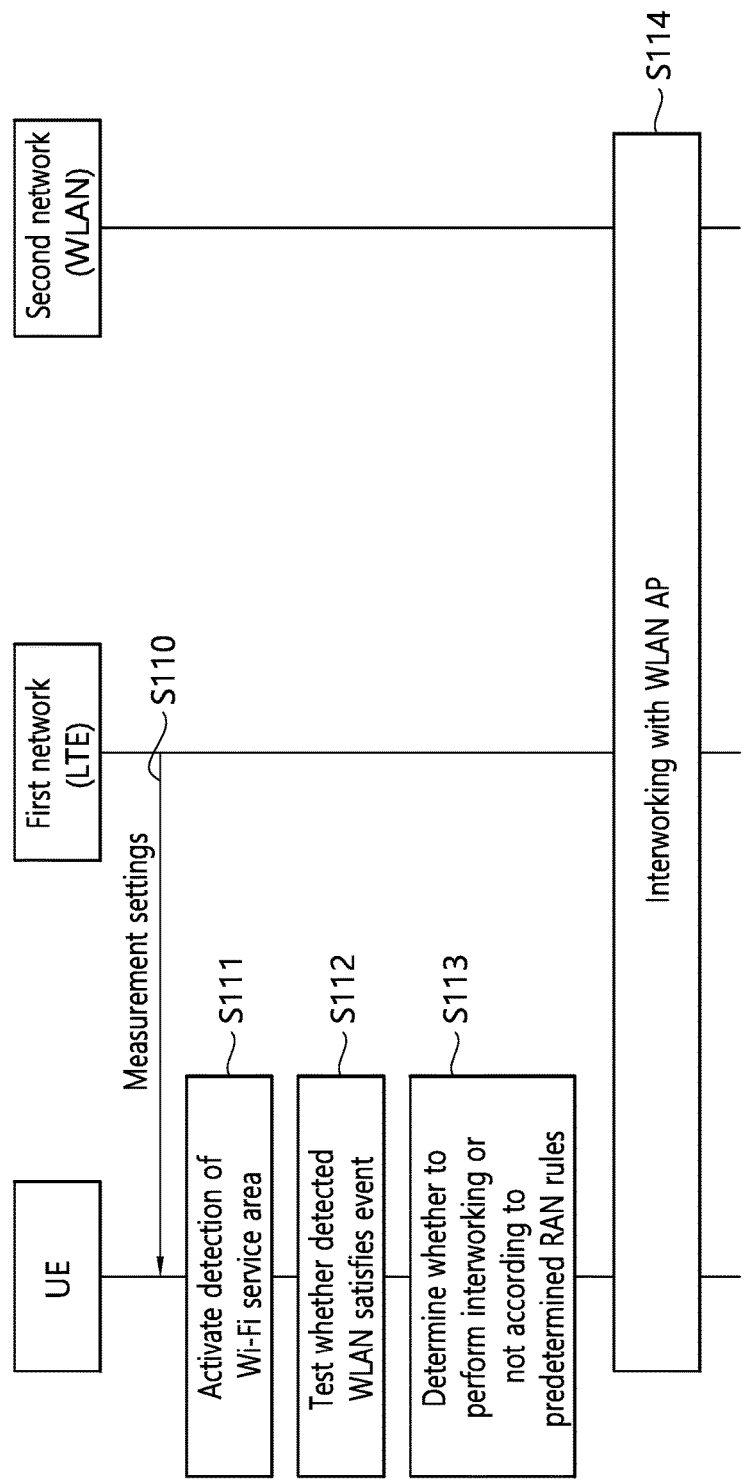
FIG. 9 illustrates a method for operating a UE for interworking according to the conventional art.

FIG. 9 illustrates a method for operating a UE for interworking according to the conventional art.

Referring to FIG. 9, a first network provides a measurement configuration for a WLAN to a UE (S110). The measurement configuration may include a set consisting of an SSID, a BSSID, a HESSID, etc. of a WLAN to which the UE is permitted to be connected. The measurement configuration may include information indicating an event the WLAN has to satisfy. Generally, the measurement configuration may include information indicating the identifier of a second network to which the UE is permitted to be connected, a measurement target, and types of measurements that should be made. In this embodiment, the WLAN is given as an example of the second network.

The UE activates the detection of a Wi-Fi service area (S111). That is, the UE takes action to detect an area serviced by the second network. For example, if the Wi-Fi module in the UE is off, the UE activates the Wi-Fi module and detects the Wi-Fi service area.

If the UE detects a frequency (channel) or WLAN designated by the measurement configuration, it obtains additional information on the detected frequency (channel) or WLAN. For example, such information as the signal level, channel utilization, and backhaul data rate of the detected WLAN is obtained. The UE determines whether the detected WLAN satisfies a specific event based on the additional information (S112). For example, the UE may perform a test whether the APs in the detected WLAN satisfy a specific event.

The UE determines whether to perform interworking or not according to predetermined RAN rules (S113).

In an example of interworking, the UE may control traffic transfer from a first network to a second network. In this case, the RAN rules are as follows:

(I) Conditions for control of traffic transfer to WLAN access network 1) measurement value of RSRP (measured_RSRP)<threshold of low RSRP (Threshold_RSRP_low), measurement value of 3GPP load (measured_3GPPLoad)>threshold of high 3GPP load (Threshold_3GPPLoad_High): The measured RSRP of an LTE, i.e., the first network, is lower than a threshold, and the measured load is higher than a threshold.

2) measurement value of the WLAN load (measured_WLANLoad)<threshold of low WLAN load (Threshold_WLANLoad_Low), measurement value of WLAN signal strength (measured_WLANsignal)>threshold of high WLAN signal strength (Threshold_WLANsignal_high): The signal strength of the WLAN, i.e., the second network, is higher than a threshold, and the measured load is lower than a threshold.

For reference, if the UE wants to transfer traffic from the second network to the first network, the traffic condition conditions may be as follows:

(II) Conditions for control of traffic transfer to 3GPP access network measurement value of RSRP (measured_RSRP)>threshold of high RSRP (Threshold_RSRP_high)

measurement value of 3GPP load (measured_3GPPLoad)<threshold of low 3GPP load (Threshold_3GPPLoad_High)

measurement value of WLAN load (measured_WLANLoad)>threshold of high WLAN load (Threshold_WLANLoad_high)

measurement value of WLAN signal strength (measured_WLANsignal)<threshold of low WLAN signal strength (Threshold_WLANsignal_low)

Meanwhile, in the test of traffic control conditions described above, one or more of the conditions may be combined (and/or). For example, the following traffic control test conditions may be achieved by combining one or more conditions.

Traffic control test condition for traffic transfer to WLAN: (measured_RSRP<Threshold_RSRP_low) and (measured_WLANLoad<Threshold_WLANLoad_low) and (measured_WLANsignal>Threshold_WLANsignal_high)

Traffic control test condition for traffic transfer to 3GPP: (measured_RSRP>Threshold_RSRP_low) or (measured_WLANLoad>Threshold_WLANLoad_high) or (measured_WLANsignal<Threshold_WLANsignal_low).

When deciding to perform interworking, the UE performs interworking over the first and second networks (S114).

As seen from above, in the conventional art, a network informs a UE of interworking rules, and the UE determines whether to perform interworking or not by itself.

Meanwhile, a transmitting end may split one data stream into multiple partial streams and transmit them over different networks, and a receiving end may receive and aggregate the multiple partial streams into a data stream. For example, the transmitting end may split a data stream into first and second partial streams, and transmit the first partial stream over an LTE and the second partial stream over a WLAN. Then, the receiving end may receive the first and second partial streams over the LTE and the WLAN and aggregate them to restore/create the single data stream.

In this transmission scheme, it is very important to control transmission delays to below a certain value when transmitting each partial stream. If the transmission delay of a particular partial stream is greater than the certain value, it can be difficult to aggregate the partial streams to properly create the original data stream, and re-transmissions of the partial streams can take place, thus leading to an abrupt decrease in transmission efficiency.

Meanwhile, even if the UE enters the service area of the WLAN, it cannot receive service immediately through the WLAN. This is because the UE has to perform procedures such as authentication, association, and, if necessary, authorization, after entering the WLAN service. According to the conventional art, the UE determines whether an interworking condition is satisfied or not according to predetermined rules. By the way, even if the interworking condition is satisfied, it takes time for the WLAN to perform the procedures such as authentication, association, and authorization, and these procedures may not be successful. Moreover, according to the conventional art, the base station does not know whether the UE has successfully performed the procedures such as authentication, association, and authorization on the WLAN. This makes it difficult for 3GPP access networks such as LTE and LTE-A to efficiently perform interworking.

Now, embodiments of the present invention for resolving this problem will be described.

Figure 10:
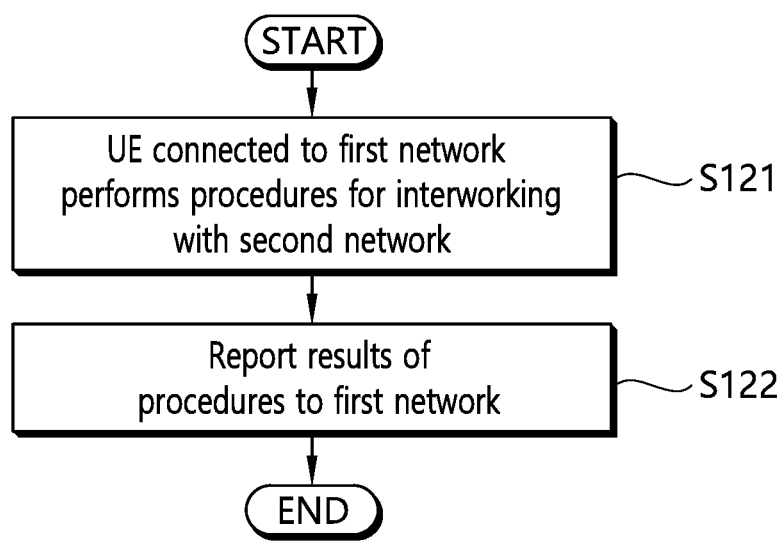
FIG. 10 represents a method for operating a UE for interworking according to an embodiment of the present invention.

FIG. 10 represents a method for operating a UE for interworking according to an embodiment of the present invention.

Referring to FIG. 10, a UE connected to a first network performs procedures for interworking with a second network (S121). The procedures for interworking may include an authentication procedure, an association procedure, or authorization procedure of the second network.

The UE reports the results of the procedures for interworking to the first network (S122). The results of the procedures for interworking may include information indicating an AP (access point) in the second network for which the UE has successfully performed the procedures for interworking.

Now, more concrete examples of application of the method of FIG. 10 will be described below.

Figure 11:
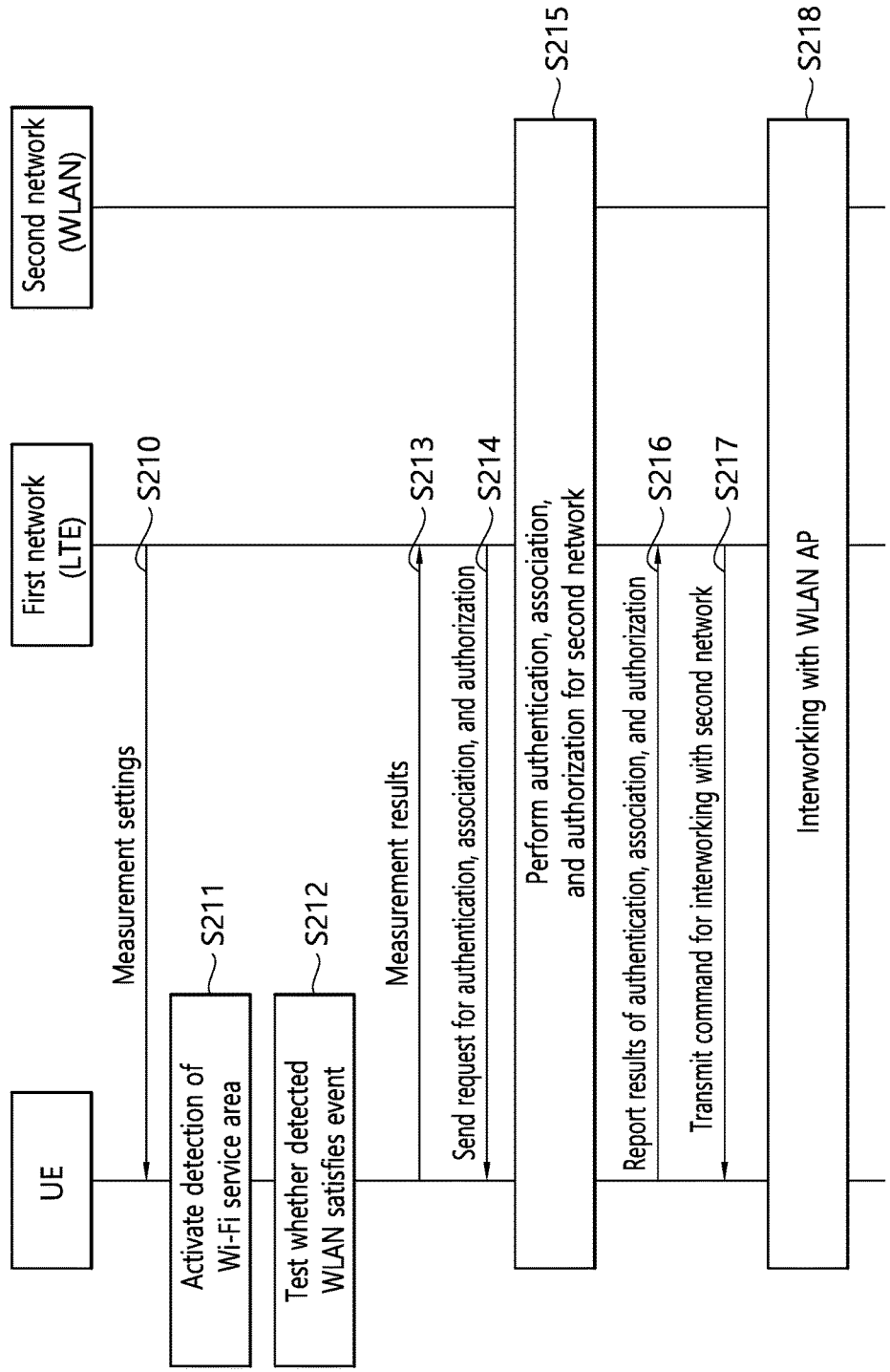
FIG. 11 represents a UE operation method according to a first embodiment of the present invention to which the method of FIG. 10 applies.

FIG. 11 represents a UE operation method according to a first embodiment of the present invention to which the method of FIG. 10 applies.

Referring to FIG. 11, a first network (LTE) may provide a measurement configuration to measure a frequency (channel) or WLAN indicated by the UE (S210).

The measurement configuration may include a set consisting of a service set identifier), a BSSID (basic service set identifier), and an HESSID (Homogeneous Extended Service Set Identifier) to which the UE is permitted to be connected.

The following Table 2 is an example of fields contained in the measurement configuration for the WLAN.

TABLE 2

| field | Description |
| --- | --- |
| BSSID | Basic Service Set Identifier.<br>BSSID may be the MAC address of an wireless AP |
| SSID | Service Set Identifier |
| HESSID | Homogeneous Extended Service Set Identifier |
| Domain Name List | A list of one or more domain names of entities which are operating an WLAN access network. |
| Operating class, channel number | Indicates the target WLAN frequency |

The measurement configuration may include information indicating an event the WLAN has to satisfy. The following table shows examples of events the WLAN has to satisfy.

TABLE 3

| Event | Description |
| --- | --- |
| W1 | The WLAN is better than a threshold for triggering a transfer of traffic to the WLAN |
| W2 | The WLAN is worse than a threshold for triggering a transfer of traffic to the WLAN |
| W3 | The radio quality of a 3GPP cell is worse than a threshold, and the radio quality of the WLAN is better than the threshold (A condition for transferring traffic to the WLAN). |
| W4 | The radio quality of the WLAN is worse than the threshold, and the radio quality of the 3GPP cell is better than the threshold (A condition for transferring traffic from the WLAN to the 3GPP cell). |

The UE activates the detection of a Wi-Fi service area (S211). If the Wi-Fi module in the UE is off, the UE activates the Wi-Fi module and detects the Wi-Fi service area.

If the UE detects a frequency (channel) or WLAN designated by the measurement configuration, it obtains additional information on the detected frequency (channel) or WLAN. For example, such information as the signal level, channel utilization, and backhaul data rate of the detected WLAN is obtained. The UE determines whether the detected WLAN satisfies a specific event based on the additional information (S212).

Upon deciding that the detected WLAN satisfies a specific event, the UE reports the measurement results and the additional information to the first network (S213).

The following table is an example of the measurement results reported to the first network.

TABLE 4

| field | Description |
| --- | --- |
| RCPI | Received Channel Power Indicator.<br>A measurement of the reception RF power in a selected channel of a received frame. Measured within the range of −110 to 0 dBM. |
| RSNI | Received Signal to Noise Indicator.<br>Indicates the signal-to-interference-plus-noise ratio of a received WLAN frame. |
| RSSI | Received Signal Strength Indicator.<br>Indicates the strength of a received radio signal. The measurement result may be reported at the timing of beacon transmission. |
| BSS Load | The BSS includes information on traffic levels. |
| WLAN metrics | Indicates whether the capacity of an WLAN AP is full and the link state.<br>Estimates the downlink/uplink speeds. |

The first network may send a request to the UE to perform procedures (e.g., authentication, association, and authorization) for interworking with a designated WLAN AP (S214). That is, the request may include information indicating at least one AP (access point) in a second network.

The UE performs the procedures (authentication, association, and authorization) for interworking with a designated WLAN AP (S215).

The UE reports the results of the procedures (authentication, association, and authorization) for interworking to the first network (S216). The results of the procedures for interworking may include information on whether the authentication, association, and authorization of a specific WLAN AP are successful, the identifier of the specific WLAN AP, and so on. Based on the result reported by the UE, the first network may find out whether the UE is ready for interworking with the second network.

The first network may transmit a command for instructing the UE to interwork with the second network (S217). In this case, the first network may transmit the command based on the results of the procedures for interworking.

The first network performs interworking with the second network (S218). The first network performs interworking an AP in the second network, which is included in the results of the procedures for interworking. For example, interworking may be performed in such a way that a specific bearer provided only over the first network is provided over the second network.

Meanwhile, in FIG. 11, the step of transmitting a command for instructing the UE to interwork with the second network may be omitted.

Figure 12:
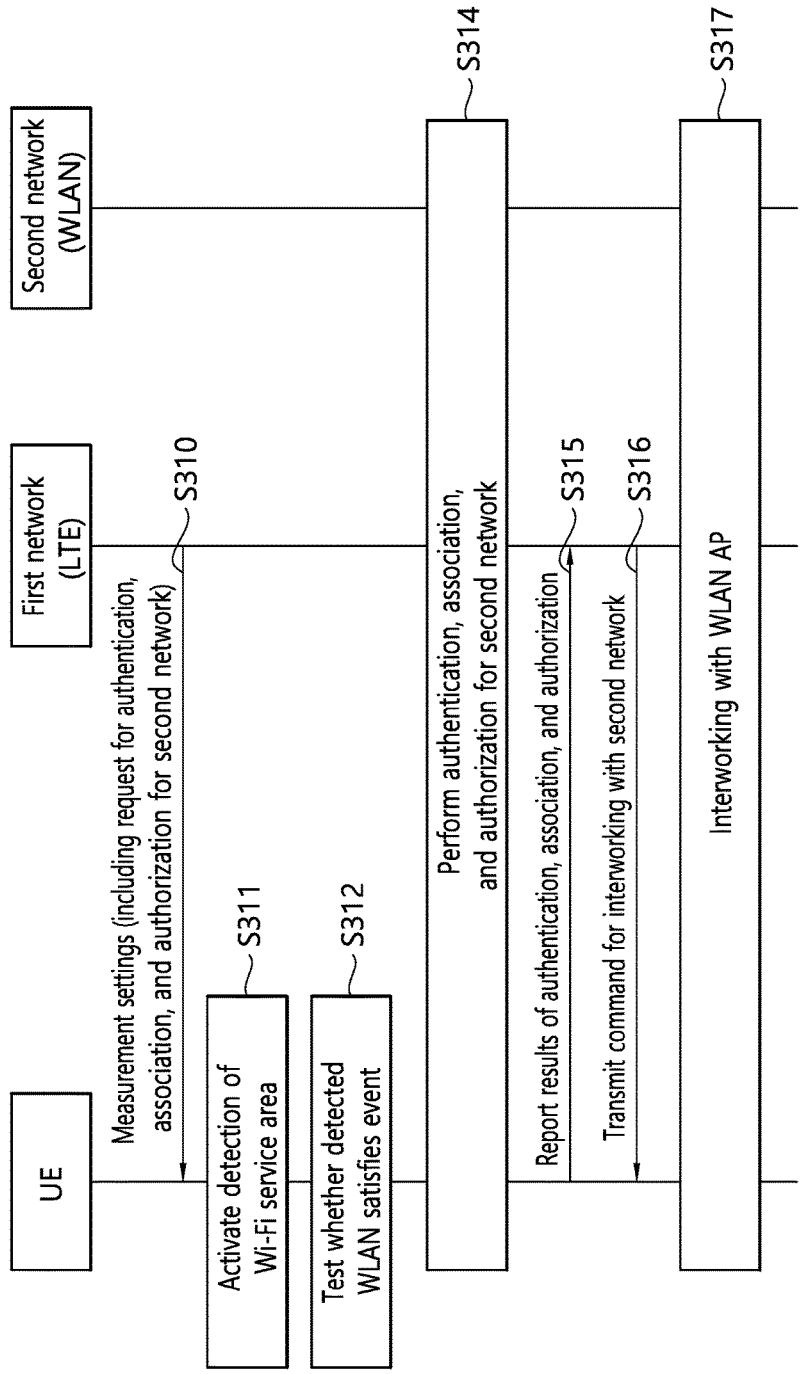
FIG. 12 represents a UE operation method according to a second embodiment of the present invention to which the method of FIG. 10 applies.

FIG. 12 represents a UE operation method according to a second embodiment of the present invention to which the method of FIG. 10 applies.

Referring to FIG. 12, a first network (LTE) may provide a measurement configuration that include information indicating whether to perform authentication, association, and authorization procedures for a second network to the UE (S310). That is, as opposed to FIG. 11, the measurement configuration may additionally include information indicating whether to perform authentication, association, and authorization procedures for interworking with a second network.

The UE activates the detection of a Wi-Fi service area (S311). If the UE detects a frequency (channel) or WLAN designated by the measurement configuration, it obtains additional information on the detected frequency (channel) or WLAN. For example, such information as the signal level, channel utilization, and backhaul data rate of the detected WLAN is obtained. The UE determines whether the detected WLAN satisfies a specific event based on the additional information (S312).

If the measurement configuration require the UE to perform authentication, association, and authorization procedures, the UE may attempt to perform the authentication, association, and authorization procedures on the detected WLAN AP (S314), and report to the first network information indicating whether the authentication, association, and authorization procedures are successful, along with the measurement results (S315). That is, the UE may report to the first network the results of the procedures for interworking, along with the measurement results.

The first network may transmit a command for instructing the UE to network with the second network (S316). The first network may transmit the command based on the results of the procedures for interworking.

The first network performs interworking with the second network (S317). The first network performs interworking an AP in the second network, which is included in the results of the procedures for interworking.

FIGS. 13 to 17 illustrate an interworking structure for a first network LTE and a second network WLAN.

A variety of interworking architectures may be used depending on how the base station eNB of the LTE and APs in the WLAN interwork with each other.

Figure 14:
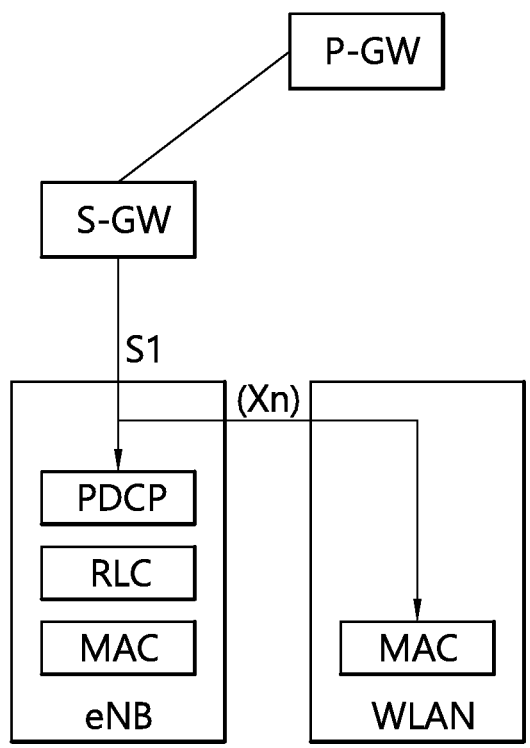

In FIG. 13(a), traffic is branched off at the S-GW (serving gateway). In FIG. 13(b), traffic is branched off at the P-GW (PDN gateway). In FIG. 14, traffic is branched off at the base station eNB. In the case of the base station eNB, traffic may be delivered up to the RLC layer of the first network LTE and then branched off to the second network, as shown in FIG. 15(a), or traffic may be branched before it is processed at the PDCP layer, as shown in FIG. 15(b).

Figure 17:
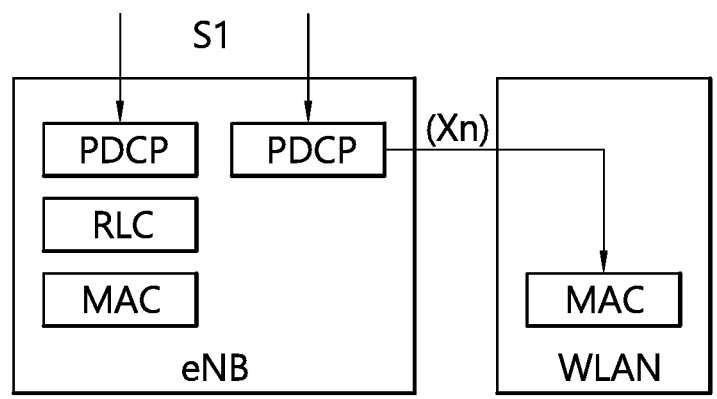

Alternatively, traffic may be delivered up to the PDCP layer of the first network LTE and then branched off to the second network, as shown in FIG. 16(a), or traffic may be branched after it is processed at the RLC layer, as shown in FIG. 16(b). In FIG. 17, traffic is branched after it is processed at the PDCP layer of the base station. The base station eNB may not have the RLC and MAC layers for branching traffic off to the second network WLAN.

The preset invention also may apply to other interworking architectures than the above interworking architecture.

The above-described first network and second network may be generalized as follows. That is, the first network may be a network in which the base station is operated in a licensed band, and the second network may be a network in which the base station is operated in an unlicensed band. In this case, an EPS bearer that may receive service over the first network in which the base station is operated in a licensed band may be referred to as a first-type bearer, and an EPS bearer that may receive service over the second network in which the base station is operated in an unlicensed band may be referred to as a second-type bearer.

Figure 18:
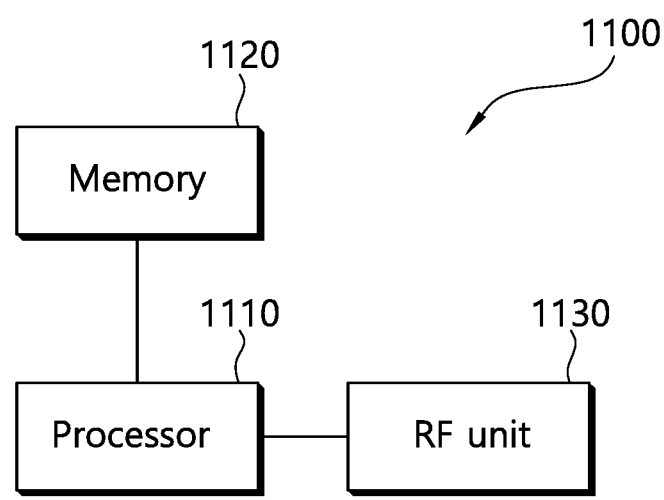
FIG. 18 is a block diagram of a UE for which an embodiment of the present invention can be implemented.

FIG. 18 is a block diagram of a UE for which an embodiment of the present invention can be implemented.

Referring to FIG. 18, a UE 1100 includes a processor 1110, a memory 1120, and an RF unit (radio frequency unit) 1130. The UE 1100 may be connected to a first network (3GPP-based access network; LTE/LTE-A).

The processor 1110 implements the proposed function, process and/or method. The processor 1110 may perform procedures for interworking with a second network and report the results of the procedures for interworking to the first network.

The RF unit 1130 is connected to the processor 1110 and sends and receives radio signals. The RF unit 1130 may include one or more RF units for communication with a 3GPP-based access network and communication with a non-3GPP-based access network.

The processor 1110 may include an ASIC (application-specific integrated circuit), other chipsets, logical circuits, and/or data processing devices.

The memory 1120 may include read-only memory (ROM), random access memory (RAM), flash memory, memory card, storage medium and/or other storage device. The RF unit 1130 may include a baseband circuit for processing radio signals. When the embodiment is implemented by software, the foregoing technique may be implemented by a module (process, function, etc.) performing the foregoing function. The module may be stored in the memory 1120, and executed by the processor 1110. The memory 1120 may be located inside or outside the processor 1110, and connected to the processor 1110 using various well-known means.

What is claim is:

1. A method for transmitting a result report in a wireless communication system, the method performed by a user equipment (UE), which is connected with a base station (BS) of a long term evolution (LTE) network, and comprising:
   receiving, from the BS, a measurement configuration for an access point (AP) of a wireless local area network (WLAN),
   wherein the measurement configuration includes information on the AP to which the UE is allowed to connect, and information for an event which must be satisfied by the AP in order for the UE to connect to the AP;
   performing, with the AP, an authentication procedure based on the measurement configuration;
   transmitting, to the BS, the result report after performing the authentication procedure,
   and
   wherein the result report includes information on the AP;
   receiving, from the BS, a command after transmitting the result report; and
   interworking with the AP after receiving the command,
   wherein the result report includes information informing the BS that the authentication procedure with the AP was successfully performed, and
   wherein the UE interworks with the AP based on the command received from the BS which instructs the UE to interwork with AP.

2. A user equipment (UE) which is connected to a base station (BS) of a long term evolution (LTE) network, the UE comprising:
   a transceiver; and
   a processor, functionally coupled to the transceiver, wherein the processor is configured to:
   control the transceiver to receive, from the BS, a measurement configuration for an access point (AP) of a wireless local area network (WLAN),
   wherein the measurement configuration includes information on the AP to which the UE is allowed to connect, and information for an event which must be satisfied by the AP, in order for the UE to connect to the AP;
   perform, with the AP, an authentication procedure based on the measurement configuration;
   control the transceiver to transmit, to the BS, the result report after performing the authentication procedure,
   and
   wherein the result report includes information on the AP;
   receiving, from the BS, a command after transmitting the result report; and
   interworking with the AP after receiving the command,
   wherein the result report which includes information informing the BS that the authentication procedure for the AP was successfully performed, and
   wherein the UE interworks with the AP based on the command received from the BS which instructs the UE to interwork with AP.

* * * * *